United States Patent [19]

Shimamune et al.

[11] Patent Number: 5,114,549
[45] Date of Patent: May 19, 1992

[54] METHOD AND APPARATUS FOR TREATING WATER USING ELECTROLYTIC OZONE

[75] Inventors: Takayuki Shimamune, Tokyo; Shuji Nakamatsu, Kanagawa; Isao Sawamoto, Kanagawa; Hiroshi Masuda, Kanagawa; Yoshinori Nishiki, Kanagawa, all of Japan

[73] Assignee: Permelec Electrode Ltd., Kanagawa, Japan

[21] Appl. No.: 784,738

[22] Filed: Oct. 29, 1991

Related U.S. Application Data

[63] Continuation of Ser. No. 413,499, Sep. 27, 1989.

[30] Foreign Application Priority Data

Sep. 29, 1988 [JP] Japan .................. 63-244980

[51] Int. Cl.$^5$ ............................... C02F 1/78
[52] U.S. Cl. .................. 204/149; 204/129; 204/151; 204/263; 210/760
[58] Field of Search ............ 204/149, 129, 151, 176, 204/164, 263; 210/760

[56] References Cited

U.S. PATENT DOCUMENTS

| | | | |
|---|---|---|---|
| 3,925,176 | 12/1975 | Okert | 204/149 |
| 4,255,257 | 3/1981 | Greiner et al. | 210/709 |
| 4,416,747 | 11/1983 | Menth et al. | 204/129 |
| 4,548,716 | 10/1985 | Boeve | 210/652 |

FOREIGN PATENT DOCUMENTS 1190352 5/1970 United Kingdom .

OTHER PUBLICATIONS

J. Elec. Soc., vol. 132, No. 2, pp. 367-371 (Feb. 1985).

*Primary Examiner*—John Niebling
*Assistant Examiner*—Arun S. Phasge
*Attorney, Agent, or Firm*—Sughrue, Mion, Zinn, Macpeak & Seas

[57] ABSTRACT

A method and apparatus for water treatment is described, using electrolytic zone, which comprises electrolyzing water to generate an ozone-containing gas in the anode compartment of an electrolytic cell, separating the ozone-containing gas from the anolyte, and contacting the separated ozone-containing gas with the water to be treated said water to be treated being different than the water for electrolysis.

19 Claims, 1 Drawing Sheet

METHOD AND APPARATUS FOR TREATING WATER USING ELECTROLYTIC OZONE

BACKGROUND OF THE INVENTION

The present invention relates to a method and apparatus for treating water using ozone generated with an electrolytic ozonizer.

Ozone is drawing researchers' attention as a powerful and clean oxidizer, and ozone is increasingly used as a water treating agent. Among the many advantages of ozone for use in water treatment, the following are notable: since it decomposes to oxygen, ozone does not remain in the treated water unlike conventionally used chlorine-based chemicals, and ozone decomposes so rapidly that no residual toxicity which may lead to secondary pollution occurs.

Ozone for as an oxidizer is conventionally generated by two basic processes, namely, electric discharge and electrolysis. In the first method, an electric discharge such as a silent discharge is produced in bone dry air or oxygen gas to generate ozone. The ozone generated by electric discharge is characterized in that its concentration is relatively low being less than or equal to about 10%, the gaseous product contains substantially no water and is contaminated by the discharge electrode material. If air is used as an ozone source, the nitrogen component is oxidized to generate NOx, and a significant amount of NOx is present in the product gas.

When the ozone generated by electric discharge is used in water treatment, various disadvantages arise. In particular, because of its low concentration, the ozone dissolves in the water to insufficiently treat the water resulting in low operational efficiency. Additionally, dry ozone takes a longer time to dissolve in the water to be treated than wet ozone. Furthermore, the generated ozone contains the electrode material as an impurity which is not a problem as long as the contaminated ozone is used in the treatment of ordinary water, but which must be removed when pure water, in particular ultrapure water, is to be produced.

To avoid the above-noted disadvantages of ozone generation by electric discharge, the industry is shifting attention to "electrolytic ozone" generated by the electrolysis of water as described in U.S. Pat. No. 4,416,747 and *J. Elec. Chem. Soc.*, 132, p. 367 ff (1985), although electrolysis is somewhat lower in power efficiency as compared to electric discharge. In this approach, water is electrolyzed using lead dioxide, gold, platinum, etc. either as electrodes alone or as electrode substances attached to opposite sides of a solid polymer electrolyte (SPE) diaphragm to provide a "SPE type" electrode structure. Ozone, the product of water electrolysis, is evolved at the anode as a mixture with oxygen. The product ozone or "electrolytic ozone" generated in the liquid system is saturated with water vapor, and dissolves readily in the water to be treated. Furthermore, the ozone can be obtained in concentrations higher than 15 wt. %. When electrolytic ozone is to be employed in water treatment, the conventional practice comprises either supplying part of the water to be treated directly into the anode compartment such that the ozone in the anolyte acts directly on the water, or injecting the ozone-containing anolyte directly into the water to be treated. The first method has the advantage of fully exploiting the above-described features of electrolytic ozone. On the other hand, the presence of the water to be treated in the electrolytic cell causes contamination of the anolyte by impurities in the water, resulting in the generation of low-purity ozone. Furthermore, such impurities are deposited onto the electrodes and the diaphragm in the cell thereby reducing the efficiency of electrolysis. Moreover, the anolyte may backflow as a result of variations in the supply pressure of the water to be treated.

The above-noted problems are absent from the second approach wherein ozone-containing anolyte is injected into the water to be treated. However, the electrode substances are present in trace amounts in the anolyte, and thereby contaminates the water being treated. Because of this disadvantage, the second approach is unsuitable for use in the treatment of high-purity water, i.e., ultrapure water, for use in the semiconductor industry.

SUMMARY OF THE INVENTION

A first object of the present invention is to provide a method that is free from the above-described problems of the conventional methods of water treatment using electrolytic ozone, which does not contaminate the electrolytic cell and the electrolyte, and which provides stable electrolysis operation.

A second object of the present invention is to provide an apparatus suitable for use in the implementation of the method of the present invention.

The first object of the present invention is attained by a method of water treatment using electrolytic ozone which comprises electrolyzing water to generate an ozone-containing gas in the anode compartment of an electrolytic cell, separating the ozone containing gas from the anolyte, and contacting the separated ozone-containing gas with the water to be treated, said water to be treated being different than the water for electrolysis.

The first object of the present invention is also attained by a method of water treatment using electrolytic ozone, the water to be treated being divided into a main portion and a branched portion, which comprises electrolyzing water to generate an ozone-containing gas in the anode compartment of an electrolytic cell, separating said gas from the anolyte, contacting the separated ozone-containing gas with the water of the branched portion to establish a predetermined concentration of ozone in said water of the branched portion, and mixing said branched portion with the main portion of water to effect overall treatment of said water to be treated, said water to be treated being different than the water for electroysis.

The second object of the present invention is attained by an apparatus for water treatment, comprising an electrolytic cell for the generation of an ozone-containing gas having an anode compartment and a cathode compartment; and means for contacting the ozone-containing gas separated from the anolyte with the water to be treated to dissolve the ozone-containing gas into the water.

The object of the present invention is also attained by an apparatus for water treatment, comprising supply means for the water to be treated, said supply means including a branched portion and a main portion; an electrolytic cell for the generation of an ozone-containing gas having an anode compartment and a cathode compartment; means for contacting the ozone-containing gas separated from the anolyte with the water of the branched portion to dissolve the ozone-containing gas into the water; and means for mixing the water of the branched portion containing the dissolved ozone-containing gas with the water of the main portion.

In the methods and apparatuses described above, a SPE type electrolytic ozonizer having electrode active materials attached to opposite sides of a solid electrolyte polymer (SPE) diaphragm is preferably used.

DETAILED DESCRIPTION OF THE INVENTION

Figure 1:
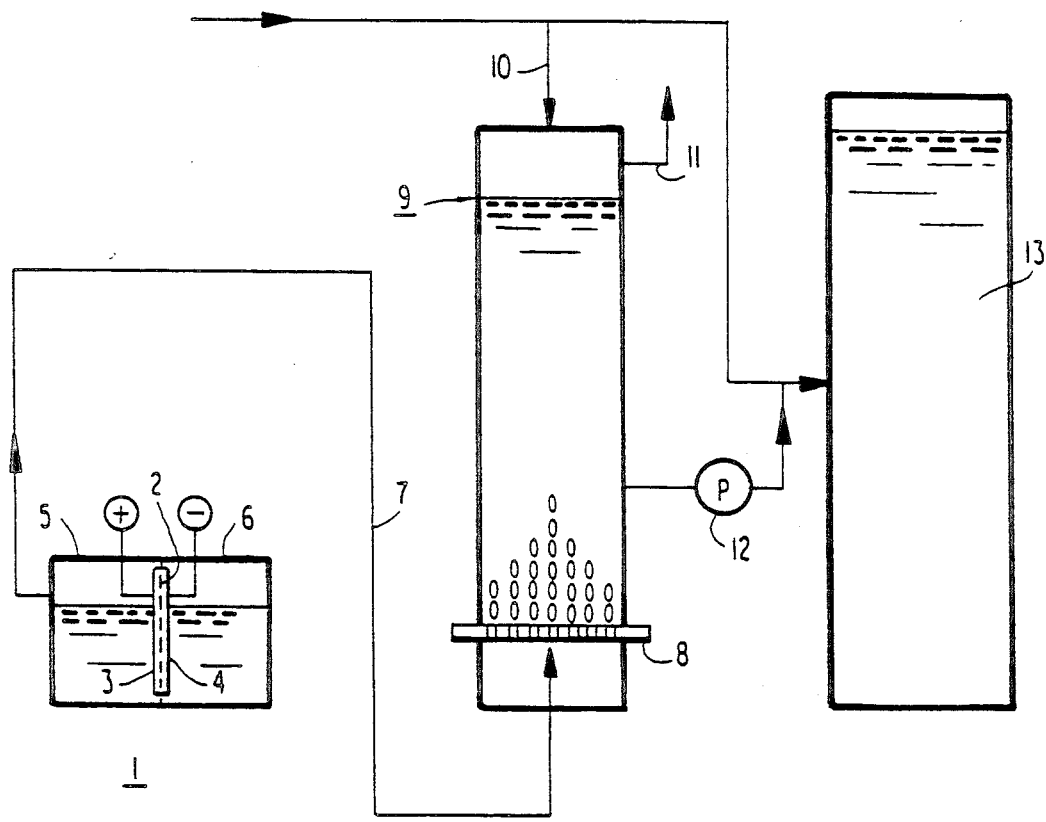
FIG. 1 schematically shows an example of the process of the present invention of treating water with ozone by dissolving an ozone-containing gas in a branched stream portion of the water to be treated.

The present invention is principally based on gas-liquid separation of the electrolytic ozone gas generated by an electrolytic ozonizer. This separation of electrolytic ozone gas for use in the treatment of water is hitherto unknown.

The electrolytic approach as applied to ozone generation produces ozone-containing water as an anolyte. In conventional treatment methods, the anolyte is directly injected into the water to be treated to oxidize or otherwise treat the water or alternatively, the water to be treated per se is injected into the electrolytic cell. Since these methods provide high operational efficiency and do not involve any substantial problems these methods have been conventionally used and no serious attempts have hitherto been made to improve these conventional methods.

However, the present inventors have recognized that the conventional methods of water treatment which introduce electrode contaminants and other impurities into the treated water are not satisfactory for providing ultrapure water for use in the fabrication of semiconductors and other electronic devices.

Any conventional type of electrolytic ozonizer may be used in the present invention, providing that the ozone-containing gas generated in the anode compartment is removed from the ozonizer by gas-liquid separation. The ozone-containing gas may be retained temporarily in a reservoir, but is desirably brought into immediate contact with the water to be treated.

The ozone-containing gas may be used for water treatment in two basic ways. In a first embodiment, the ozone-containing gas is directly brought into contact with the water to be treated by, for example, injection. In the second embodiment, part of the water to be treated is branched into a side stream. The ozone-containing gas is dissolved into the branched stream portion by means of, for example, injection or a dissolving tower to establish a predetermined concentration of ozone in the branched portion generally in the range of from 0.1 to 100 ppm and preferably from 1 to 50 ppm, which is then mixed with the unbranched or main portion to effect overall treatment of the water. The second method requires a more complicated apparatus for treatment than the first method, but it has the advantage of effective ozone utilization. Overall treatment of water is performed after the ozone is thoroughly dissolved in the branched portion of water.

In the present invention, the site where the ozone-containing gas contacts the water to be treated is called the "passageway of water to be treated". This passageway may comprise a conduit carrying the water of the branched portion, said ozone-containing gas being injected into the conduit, or may comprise an independent dissolving tower.

The method of the present invention requires no special procedures and satisfactory results can be attained by injecting the ozone-containing gas or mixing the ozone-containing gas with the water for treatment with an appropriate degree of stirring.

The electrolytic ozonizer to be used in the present invention may be a common electrolytic cell having an anode and a cathode separated by a diaphragm. A desirable electrolytic cell is one which uses a SPE type electrode structure comprising an ion-exchange membrane that has an anodic substance of high ozone generating capability such as lead dioxide provided on one side and a cathodic substance of high hydrogen-generating capability such as platinum or nickel supported on the other side, with a fine porous current collector being attached to each of the anode and cathode substances. The conditions of electrolysis such as the temperature of electrolyte and current density are not limited in any particular manner. If electrolysis is performed at an anolyte temperature of from 20° to 40° C. and at a current density of 100 A/dm$^2$, ozone is generated in a concentration as high as 15 wt. %.

If the resulting ozone-containing gas is to be dissolved in the branched portion of the water to be treated, the ozone-containing gas may be directed through a conduit or other passageway for injection into the branched portion of water. It is, however, more desirable that the branched portion which is at least part of the water to be treated and the ozone-containing gas are introduced into a dissolving tower made of a suitable material such as stainless steel, titanium, glass or acrylic resin, such that the ozone-containing gas is more efficiently dissolved in the branched portion of water. To achieve a high efficiency of dissolution, 5 to 30% of the water to be treated is desirably branched. Since ozone has comparatively low solubility in water, the ozone-containing gas is preferably bubbled into the dissolving tower. To this end, a diffusing filter made of a material such as glass, stainless steel, titanium or ceramic and having pores of 0.1 to 10 μm in size is fitted to the bottom of a cylindrical dissolving tower and the ozone-containing gas is supplied into the tower through the pores in the filter. The smaller the size of the pores, the smaller the size of the ozone bubbles thereby produced, and the larger the area of contact between the ozone and the water to be treated. On the other hand, an increasing pressure drop will result as the pore size decreases. The branched portion of water supplied into the tower flows either countercurrently or concurrently so that it is brought into the ozone-containing gas to absorb the ozone. The ozone containing gas produced in the present invention has a comparatively high ozone concentration, and the branched portion of water to be treated is capable of absorbing from 1 to 100 ppm of ozone by adjusting the flow rate of gas and liquid. If the liquid flow rate is decreased and the gas flow rate increased, water containing a high concentration of ozone is produced, but the efficiency of dissolution decreases and the volume of waste ozone increases. In order to increase the dissolution efficiency, the time of gas-liquid contact must be prolonged and a contact time of 1 to 10 min is capable of achieving a 90-99% dissolution efficiency. The lower the operating temperature, the higher the concentration of ozone absorbed by the branched portion of water. Thus, by dissolving the liquid-separated ozone-containing gas in the branched portion of water to be treated, the latter has a desired comparatively high concentration of ozone dissolved therein.

The branched portion of water to be treated which has been adjusted to a desired ozone concentration is then mixed with the unbranched, main portion of water to be treated and supplied, for example, in a reaction tank. The branched portion of water to be treated is preferably supplied to the reaction tank by means of a pump equipped with a check valve to prevent backflow. The dissolving tower is preferably equipped with a mechanism that maintains a constant liquid level and this may be accomplished by control with a selenoid valve and a level sensor. The water treated in the reaction tank may immediately be used, for example, as ultrapure water in the fabrication of semiconductors or as water for swimming pools.

If the ozone-containing gas produced in the electrolytic cell and that has been subjected to gas-liquid separation is to be used directly in the treatment of water, the dissolving tower is not necessary and the ozone-containing gas may be directly injected into the water for treatment in a reaction tank or conduit.

The following nonlimiting examples are provided for the purpose of further illustrating the present invention.

EXAMPLE 1

In reference to the ozone processing flow described in FIG. 1, ozone-containing water was produced under the following conditions.

An electrolytic cell (electrolytic ozonizer) having an effective area of 90 cm$^2$ was equipped with a diaphragm 2 made of a solid polymer electrolyte Nafion ®, produced by du Pont) which had a lead dioxide powder 3 and a platinum powder 4 deposited on the anode and cathode sides, respectively. The thus constructed SPE type electrolytic cell was divided into an interior anode compartment 5 and a cathode compartment 6 by the diaphragm 2 and filled with 1 liter of pure water. When an electric current was applied to the cell 1 at a current density of 100 A/dm$^2$, a gas mixture of oxygen and 15 wt. % ozone was obtained at a rate of 27 grams/hr (about 20 liters/hr at 30° C.), with ozone being produced at a rate of 4 grams/hr. The mixed gas evolving in the anode compartment 5 was guided through a conduit 7 and supplied to the bottom of a dissolving tower 9 through a diffusing filter 8 having a diameter of 10 cm and a thickness of 0.5 mm, and containing pores of about 2 μm.

Pure water having a temperature of 25° C. was supplied into an ultrapure water producing line at a flow rate of 1 m$^3$/hr and 30% of this stream of water to be treated was branched to flow through a branch pipe 10 and supplied to the dissolving tower 9 at the top. In the dissolving tower 9, the branched portion of water was brought into contact with the gas mixture supplied from the bottom, thereby dissolving the gas mixture in the branched portion of water. The undissolved gas was discharged from a port 11 and diffused into the surroundings.

The branched portion of water having the gas mixture dissolved therein was supplied into a reaction tank 13 by means of a pump 12 together with the unbranched portion of water, and the total volume of water was treated with ozone. The ozone-containing water had an ozone concentration of 12 ppm at the outlet of the dissolving tower 9 and the ozone concentration measured at the discharge port 11 was 5000 ppm. The water in the reaction tank 13 had an ozone concentration of 3.6 ppm and no lead was detected in the ozone-containing water in the reaction tank 13. The pressure in the anode compartment of the electrolytic cell 1 was stable at about 1.4 atm. over a prolonged period notwithstanding the pressure variation in the pure water supply.

COMPARATIVE EXAMPLE 1

Using electrolytic cell 1 of the same type as employed in Example 1, pure water was electrolyzed under the same conditions as in Example 1 to obtain an ozone-containing gas. With the ozone-containing gas being dissolved in the anolyte, the latter was injected into the pure water at a flow rate of about 1 liter/hr to purify the water. The ozone-containing anolyte recovered from the electrolytic cell contained about 2 ppb of lead.

EXAMPLE 2

Treatment with ozone was performed as in Example 1 except that pure water was replaced by the water in a swimming pool which was allowed to flow at a rate of 10 m$^3$/hr with 10% branching.

The ozone-containing water had an ozone concentration of 2 ppm at the outlet of the dissolving tower 9. The ozone concentration measured at the discharge port 11 was 5000 ppm. The water being treated in the reaction tank 13 had an ozone concentration of 0.2 ppm and the ozone concentration measured at the outlet of the tank was 0 ppm. No lead was detected in the water being treated in the reaction tank 13. The pressure in the anode compartment of the electrolytic cell 1 was stable at about 1.4 atm. over a prolonged period notwithstanding the pressure variations of the water supply.

EXAMPLE 3

Pure water was treated with ozone in the reaction tank as in Example 1 except that the dissolving tower and the branching line were eliminated from the ozone treating system and that the ozone-containing gas evolved in the electrolytic cell was directly introduced into the reaction tank.

The water being treated in the reaction tank had an ozone concentration of about 30 ppm and no lead was detected therein. The pressure in the anode compartment of the electrolytic cell was stable at about 1.4 atm. over a prolonged period notwithstanding the pressure variation of the pure water supply.

In the present invention, the ozone-containing gas evolved in the anode compartment of an electrolytic cell is separated from the anolyte before being brought into direct contact with the water to be treated. Alternatively, the separated ozone-containing gas is dissolved in the branched portion of water to be treated so as to establish a predetermined concentration of ozone in the branched portion of water, which is then mixed with the unbranched, main portion of water to effect overall treatment of the water.

According to the method of the present invention, the anolyte does not make direct contact with the water to be treated, so that electrode substances contaminating the anolyte will not contaminate the water to be treated. Therefore, the present invention is particularly effective for the treatment of water requiring a very high purity. Furthermore, the water to be treated is not present in the anolyte, such that impurities that may be present in the water to be treated are not be introduced into the electrolytic cell thereby avoiding problems such as shortening the life of the electrodes.

As another advantage, the anolyte does not directly contact the water being treated, such that pressure variations in the supply of the water being treated do not effect on the anolyte, thereby allowing the water to be treated with ozone under stable electrolysis conditions.

While the invention has been described in detail and with reference to specific examples thereof, it will be apparent to one skilled in the art that various changes and modifications can be made therein without departing from the spirit and scope thereof.

What is claimed is:

1. A method of water treatment using electrolytic ozone, which comprises electrolyzing water in an electrolytic cell comprising an anode compartment and a cathode compartment separated by an ion-exchange membrane having on the anode side thereof an anodic substance of ozone-generating capacity to generate an ozone-containing gas in the anode compartment of the electrolytic cell, separating the ozone-containing gas from the anolyte, and contacting the separated ozone-containing gas with the water to be treated, said water to be treated being different than the water for electrolysis.

2. A method of water treatment using electrolytic ozone, the water to be treated being divided into a main portion and a branched portion, which comprises electrolyzing water in an electrolytic cell comprising an anode compartment and a cathode compartment separated by an ion-exchange membrane having on the anode side thereof an anodic substance of ozone-generating capacity to generate an ozone-containing gas in the anode compartment of the electrolytic cell, separating said gas from the anolyte, contacting the separated ozone-containing gas with the water of the branched portion to establish a predetermined concentration of ozone in said water of the branched portion, and mixing said branched portion with the main portion of water to effect overall treatment of said water to be treated, said water to be treated being different than the water for electrolysis.

3. An apparatus for water treatment, comprising:
an electrolytic cell for the generation of an ozone-containing gas having an anode compartment and a cathode compartment separated by an ion-exchange membrane having on the anode side thereof an anodic substance of ozone-generating capability;
means for separating the ozone containing gas from the anolyte; and
means for contacting the ozone-containing gas separated from the anolyte, with the water to be treated to dissolve the ozone-containing gas into the water.

4. An apparatus for water treatment, comprising:
supply means for the water to be treated, said supply means including a branched portion and a main portion;
an electrolytic cell for the generation of an ozone-containing gas having an anode compartment and a cathode compartment separated by an ion-exchange membrane having on the anode side thereof an anodic substance of ozone-generating capability;
means for separating the ozone containing gas from the anolyte;
means for contacting the ozone-containing gas separated from the anolyte with the water of the branched portion to dissolve the ozone-containing gas into the water; and
means for mixing the water of the branched portion containing the dissolved ozone-containing gas with the water of the main portion.

5. An apparatus as in claim 3, wherein said contacting means comprises a conduit carrying the water to be treated, said ozone-containing gas being injected into the conduit.

6. An apparatus as in claim 4, wherein said contacting means comprises a conduit carrying the water of branched portion, said ozone-containing gas being injected into the conduit.

7. An apparatus as in claim 4, wherein said contacting means comprises a dissolving tower having a diffusing filter at the bottom of the tower, said ozone-containing gas being supplied to the dissolving tower through the diffusing filter.

8. An apparatus as in claim 4, wherein said mixing means comprises a reaction tank.

9. An apparatus as in claim 4, wherein said electrolytic cell having electrode active materials attached to opposite sides of a solid electrolyte polymer diaphragm.

10. A method as in claim 2, wherein the water of the branched portion constitutes 5 to 30% of the water to be treated.

11. An apparatus as in claim 4, wherein the water of the branched portion constitutes 5 to 30% of the water to be treated.

12. A method as in claim 1, wherein the anodic substance of ozone generating capacity is lead dioxide powder.

13. A method as in claim 1, wherein the ozone-containing gas generated in the anode compartment has an ozone content of at least 15 wt. %.

14. A method as in claim 2, wherein the anodic substance of ozone generating capacity is lead dioxide powder.

15. A method as in claim 2, wherein the ozone-containing gas generated in the anode compartment has an ozone content of at least 15 wt. %.

16. An apparatus as in claim 3, wherein the anodic substance of ozone-generating capability is lead dioxide powder.

17. An apparatus as in claim 3, wherein the ozone-containing gas generated in the anode compartment has an ozone content of at least 15 wt. %.

18. An apparatus as in claim 4, wherein the anodic substance of ozone-generating capability is lead dioxide powder.

19. An apparatus as in claim 4, wherein the ozone-containing gas generated in the anode compartment has an ozone content of at least 15 wt. %.

* * * * *